United States Patent
Engstrom et al.

(10) Patent No.: US 11,447,142 B1
(45) Date of Patent: Sep. 20, 2022

(54) ASSESSING SURPRISE FOR AUTONOMOUS VEHICLES

(71) Applicant: WAYMO LLC, Mountain View, CA (US)

(72) Inventors: Johan Engstrom, Los Gatos, CA (US); Jared Russell, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 481 days.

(21) Appl. No.: 16/414,176

(22) Filed: May 16, 2019

(51) Int. Cl.
- *B60W 50/00* (2006.01)
- *G05B 13/04* (2006.01)
- *G05D 1/00* (2006.01)
- *B60W 30/18* (2012.01)
- *G05D 1/02* (2020.01)

(52) U.S. Cl.
CPC ........ *B60W 50/0098* (2013.01); *B60W 30/18* (2013.01); *G05B 13/048* (2013.01); *G05D 1/0088* (2013.01); *G05D 1/0212* (2013.01); *B60W 2050/0014* (2013.01); *B60W 2400/00* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,104,965 B2 | 8/2015 | Fritsch | |
| 9,511,767 B1 | 12/2016 | Okumura et al. | |
| 10,037,036 B2 | 7/2018 | Nilsson et al. | |
| 2006/0106743 A1* | 5/2006 | Horvitz | G06N 7/005 706/21 |
| 2019/0193741 A1* | 6/2019 | Hitomi | B60W 40/06 |
| 2020/0096985 A1* | 3/2020 | Wenzel | G06Q 10/20 |

(Continued)

FOREIGN PATENT DOCUMENTS

| | | | | |
|---|---|---|---|---|
| WO | WO-2017016558 A1 * | 2/2017 | ...... | B60W 30/18072 |
| WO | 2017079219 A1 | 5/2017 | | |

OTHER PUBLICATIONS

"Baumann, Matthias;, Method for Predicting the Duration of a Possible Coasting Phase of a Vehicle Having a Coasting Function" (Year: 201).*

(Continued)

*Primary Examiner* — James M McPherson
*Assistant Examiner* — Bakari Underwood
(74) *Attorney, Agent, or Firm* — Fish & Richardson P.C.

(57) ABSTRACT

Aspects of the disclosure provide for controlling an autonomous vehicle. For instance, a first probability distribution may be generated for the vehicle at a first future point in time using a generative model for predicting expected behaviors of objects and a set of characteristics for the vehicle at an initial time expected to be perceived by an observer. Planning system software of the vehicle may be used to generate a trajectory for the vehicle to follow. A second probability distribution may be generated for a second future point in time using the generative model based on the trajectory and a set of characteristics for the vehicle at the first future point expected to be perceived by the observer. A surprise assessment may be generated by comparing the first probability distribution to the second probability distribution. The vehicle may be controlled based on the surprise assessment.

30 Claims, 13 Drawing Sheets

(56) References Cited

U.S. PATENT DOCUMENTS

2020/0110416 A1\* 4/2020 Hong ............... G01S 13/89
2020/0160535 A1\* 5/2020 Ali Akbarian ..... G06K 9/00342
2021/0182604 A1\* 6/2021 Anthony ............ G06K 9/00805

OTHER PUBLICATIONS

Cepelewicz, Jordana, To Make Sense of the Present, Brains, May Predict the Future, Quanta Magazine, Jul. 10, 2018, 8 pages.

Engström, Johan, Effects of ITS on drivers' behavior and interaction with the systems, Scenario Criticality Determines the Effect of Working Memory Load on Brake Response Time, Volvo Technology Corporation/SAFER, Chalmers University, (2010) pp. 25-36.

Friston, Active Inference and Cognitive Consistency, Psychological Inquiry, (2018) 29:2, pp. 67-73, DOI: 10.1080/1047840X.2018. 148069.

Friston, Active Inference: A Process Theory, Neural Computation, (2017), pp. 1-49, 29, Wellcome Trust Centre for Neuroimaging, UCL, London.

Itti, et al., Bayesian Surprise Attracts Human Attention, Elsevier, Vision Research 49 (2009) pp. 1295-1306.

Julie Pitt, Machines That Learn Through Action, slide presentation, YowConference, 2017.

Markkula, et al., A farewell to brake reaction times? Kinematics-dependent brake response in naturalistic rear-end emergencies, Elsevier, Accident Analysis and Prevention 95 (2016), pp. 209-226.

Raviv, Shaun, The Genius Neuroscientist Who Might Hold The Key to True AI, Wired Magazine, Nov. 13, 2018, 42 pages.

Svärd, et al., A quantitative driver model of pre-crash brake onset and control, Proceedings of the Human Factors and Ergonomics Society 2017 Annual Meeting, pp. 339-343.

Engström, J., Bärgman, J., Nilsson, D., Seppelt, B., Markkula, G., Bianchi Piccinini, G., & Victor, T. 2018. Great expectations: A predictive processing account of automobile driving. Theoretical Issues in Ergonomics Science. 2(19), pp. 156-194., 2018, pp. 156-194.

Markkula, Modeling Driver Control Behavior in Both Routine and Near-accident Driving, Proceedings of the Human Factors and Ergonomics Society Annual Meeting, Oct. 27-31, 2014, Chicago, USA., vol. 58 pp. 879-883.

Engström, et al, Simulating the Effect of Cognitive Load on Braking Responses in Lead Vehicle Braking Scenarios, The Institution of Engineering and Technology, 2018, pp. 1-7.

\* cited by examiner

ASSESSING SURPRISE FOR AUTONOMOUS VEHICLES

BACKGROUND

Autonomous vehicles, for instance, vehicles that do not require a human driver, can be used to aid in the transport of passengers or items from one location to another. As autonomous vehicles may behave differently from human drivers, this may induce erroneous assumptions by other road users about how an autonomous vehicle is likely to behave in the future. Such assumptions lead to uncomfortable and in some cases dangerous situations. For example, an autonomous vehicle may suddenly brake for an object which does not actually exist in the middle of an intersection. Because such behavior is typically not exhibited by human drivers, such behavior may be surprising to a road user behind the autonomous vehicle who may be assuming that the vehicle will continue through the intersection without braking. Based on this assumption, the road user may adopt a very short following distance and/or, if a human, take his or her eyes off of the autonomous vehicle. This may create a high risk for a collision or other dangerous situations.

BRIEF SUMMARY

One aspect of the disclosure provides a method of controlling an autonomous vehicle. The method includes generating a first probability distribution for the vehicle at a first future point in time using a generative model for predicting expected behaviors of objects and a set of characteristics for the vehicle at an initial time expected to be perceived by an observer; using planning system software of the vehicle to generate a trajectory for the vehicle to follow; generating a second probability distribution for a second future point in time using the generative model and based on the trajectory and a set of characteristics for the vehicle at the first future point in time expected to be perceived by the observer, wherein the initial point in time is earlier in time than the first point in time, and the first point in time is earlier in time than the second point in time; generating a surprise assessment by comparing the first probability distribution to the second probability distribution, the surprise assessment representing how surprising the trajectory is to the observer; and controlling the vehicle autonomously based on the surprise assessment.

In one example, the observer is a passenger of the vehicle. In another example, the observer is another vehicle. In another example, the observer is a pedestrian. In another example, the observer is a bicyclist. In another example, determining a state vector representing a current state of the vehicle from a perspective of the observer, and generating the behavior prediction includes inputting the state vector into the model. In another example, comparing the first probability distribution to the second probability distribution includes determining a Kullback-Leibler divergence between the first probability distribution and the second probability distribution. In another example, the trajectory includes a geometry component and a speed profile that define a future behavior of the vehicle, and the surprise assessment corresponds to how surprising the future behavior is to an observer. In another example, the observer is a road user, and the method also includes receiving sensor data identifying characteristics of the observer and using the generative model to predict a future behavior of the road user. In this example, generating the second probability distribution is further based on the predicted future behavior.

In another example, generating the behavior prediction for the vehicle includes using the generative model to provide a plurality of possible trajectories for the vehicle as well as a probability value for each of the plurality of possible trajectories, and determining the second probability distribution is further based on the plurality of possible trajectories for the vehicle as well as the probability values.

In another example, the method also includes using the planning system software to generate a second trajectory for the vehicle and determining a second surprise assessment for the second trajectory. In this example, controlling the vehicle based on the surprise assessment includes selecting one of the trajectory or the second trajectory based upon the surprise assessment and the second surprise assessment. In addition, the method also includes determining a first cost of the trajectory based on the surprise assessment and determining a second cost of the second trajectory based on the second surprise assessment. In this example, selecting one of the first trajectory or the second trajectory is further based on the first cost and the second cost. In addition, the surprise assessment indicates greater surprise than the second surprise assessment and the first cost is greater than the second cost. In addition or alternatively, determining the first cost is further based on determining surprise assessments for a plurality of different points along the trajectory. In this example, determining the first cost includes taking a weighted sum of the surprise assessment and the surprise assessments for the plurality of different points along the trajectory. In this example, taking the weighted sum includes weighing each of the surprise assessment and the surprise assessments for the plurality of different points along the trajectory based on a corresponding point in time along the trajectory such that surprise assessments that occur later in time along the trajectory have lower cost than surprise assessments that occur earlier in time along the trajectory. In another example, generating the trajectory includes attempting to determine a trajectory that does not exceed an acceptable level of surprise. In this example, when a trajectory that does not exceed the acceptable level of surprise cannot be determined, increasing the acceptable level of surprise.

DETAILED DESCRIPTION

Overview

Figure 1:
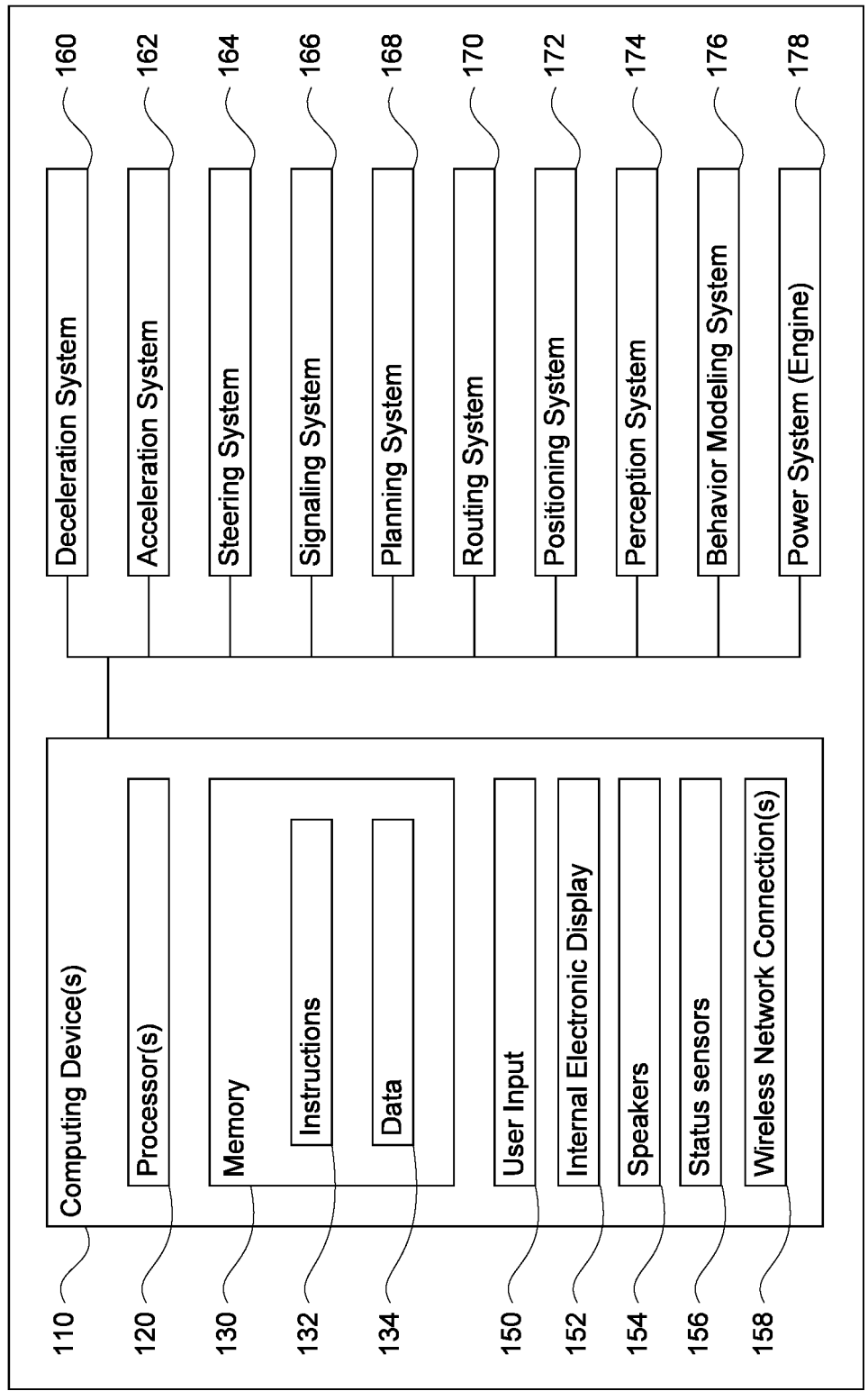
FIG. 1 is a functional diagram of an example vehicle in accordance with an exemplary embodiment.

The technology relates to assessing how surprising the behavior of a vehicle, for instance an autonomous vehicle, is to any observing road users (such as drivers of other vehicles, bicyclists, and pedestrians). For instance, as autonomous vehicles may behave differently from human drivers, this may induce erroneous assumptions by other road users about how an autonomous vehicle is likely to behave in the future. Such assumptions lead to uncomfortable and in some cases dangerous situations. For example, if an autonomous vehicle suddenly brakes or swerves for an object which other road users do not or cannot see or detect. Such behavior may be surprising to a road user behind or around the autonomous vehicle who may be assuming that the vehicle will continue through the intersection without braking. Based on this assumption, the road user may adopt a very short following distance and/or, if a human, take his or her eyes off of the autonomous vehicle. This may create a high risk for a collision or other dangerous situations.

To prevent such situations, the autonomous vehicle's computing devices may evaluate how surprising a certain action (e.g., planned, predicted, or occurred) was or would be to other road users. This surprise assessment, either counterfactual or actual, can be used by various systems of the vehicle, including the planning system, in real time to make driving decisions and to possibly trigger communication or notification events as well. This surprise assessment may also be used to assess the driving quality of the software use for autonomous vehicles offline as perceived by passengers of the autonomous vehicles and/or other road users.

In one example, the surprise assessment may include comparing vectors representing states of the autonomous vehicle and an observing road user. A first state vector, $S_{tv}$, may then be determined for the state of the vehicle at a time t based on a proposed trajectory as determined by the vehicle's planning system. Alternatively, the first state vector may be determined for the state of the vehicle at the time t based on the vehicle's actual behavior (i.e. after the vehicle has followed the trajectory). The state vector may include information such as position, speed, acceleration and jerk both relative to the road and any other road users.

A generative model may be used to determine a second state for the vehicle at the time t from the perspective of a road user observing the vehicle at some point in time before t. For instance, a state vector representing the current state of the vehicle may be input into a generative model. Again, this state vector may include information such as position, speed, acceleration and jerk both relative to the road and any other road users. An output trajectory may be used to generate the second state vector, $S_{to}$, representing the expected state of the vehicle at time t from the perspective of an observing road user.

In order to determine surprise of the vehicle from the perspective of a observing road user a subset of the sensor data from the vehicle's perception system that is expected to be perceived by the road user may be identified and input into the generative model to generate the probability distribution. For instance, this may include identifying an expected field of view for the road user corresponding to an area likely to be perceived by the road user. In this regard, only some sensor data is input into the generative model, rather than all of the information available to the autonomous vehicle. As a result, different values of $S_{to}$ may be determined for different road users.

The vectors, $S_{tv}$ and $S_{to}$ may then be compared to one another to assess actual or predicted surprise. For instance, the absolute values of the differences between the values of the vectors may represent how surprising the autonomous vehicle's expected behavior at time t (when the autonomous vehicle is following the proposed trajectory) was or would be to an observing road user.

Alternatively, rather than comparing vectors, different probability distributions may be compared in order to assess surprise. In order to do so, the vehicle's computing devices may predict or generate simulated versions what the vehicle is likely to observe at different points in time. The simulated versions of what the vehicle's perception system is expected to perceive may be generated using the generative model and the proposed trajectory. Alternatively, when assessing actual surprise, this information may be retrieved from log data. For each of the different points in time, as with the example above, what each observing road user is able to perceive may be determined. The computing devices may then use a same or a different generative model to determine a probability distribution for an observing road user's beliefs in different potential trajectories of the vehicle at different points in time. Because different information would be input into the generative model given the different information that observing road users would be likely to perceive, different probability distributions may be determined for different observing road users.

Surprise for the observing road user may be assessed by evaluating the difference between probability distributions between adjacent points in time. This may provide an estimate of how surprising the behavior of the vehicle 100 according to the planned or actual trajectory is to an observing road user. For instance, a Kullback-Leibler divergence or KL between a posterior and a prior probability density function may be used to determine a surprise assessment. The resulting assessment or surprise assessment may represent how surprising or unexpected the planned trajectory would be to other road users as well as passengers of the vehicle.

Surprise assessments can be used in various ways. For instance, an expected surprise assessment can be used by a planning system when generating trajectories to select the trajectory that has the least amount of surprise with respect to other road users. In addition, or alternatively, if a selected trajectory is assessed as likely to be surprising to other road users, the vehicle's computing devices may provide a warning message or noise (such as honking a horn) to other nearby road users. In some instances, an expected surprise assessment may be used to determine when another vehicle is likely to respond to the autonomous vehicle. Actual or counterfactual surprise assessments can also be used offline to evaluate the vehicle's planning system software or even to compare surprise assessments of different versions of the software. Alternatively, rather than using simulations, log data from miles driven by autonomous vehicles may be used to determine actual surprise and thereby to evaluate the vehicle's planning system software as well as rider comfort.

Similar assessments may be used to identify surprising behaviors in other road users.

The features described herein may thus allow for the assessment of how surprising behavior of an autonomous vehicle is to any observing road users and/or passengers of the vehicle. This surprise assessment can then be used to make various driving decisions for the autonomous vehicle. This, in turn, may reduce the likelihood of uncomfortable or possibly dangerous situations for other road users and/or passengers of the vehicle. In addition, surprise assessments may also be used offline to assess driving quality as perceived by passengers of the autonomous vehicles and/or other road users.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user inputs 150 (e.g., a mouse, keyboard, touch screen, buttons, and/or microphone) and various electronic displays (e.g., a monitor having a screen or any other electrical device that is operable to display information). In this example, the vehicle includes an internal electronic display 152 to provide information or audio-visual experiences. In this regard, internal electronic display 152 may be located within a cabin of vehicle 100 and may be used by computing devices 110 to provide information to passengers within the vehicle 100.

Computing devices 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160, acceleration system 162 and/or power system 178, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 168 may periodically generate trajectories, or short-term plans for controlling the vehicle for some period in time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
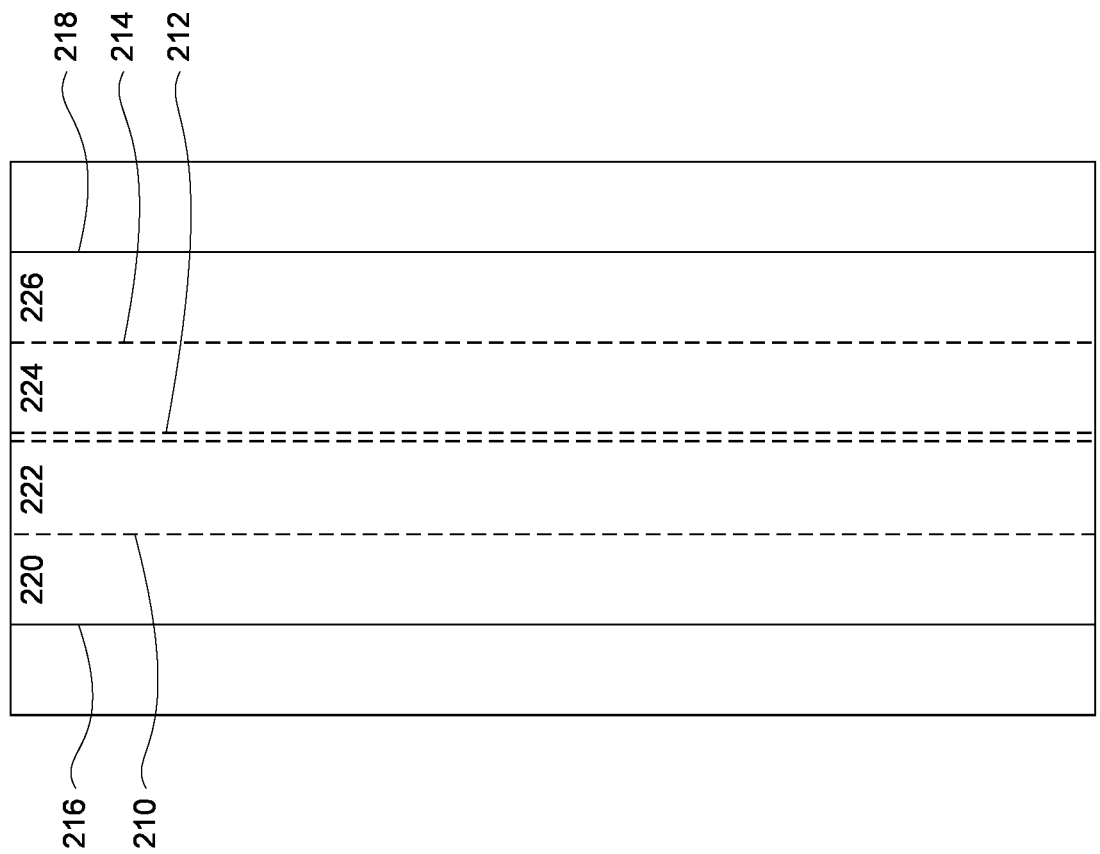
FIG. 2 is an example of map information in accordance with aspects of the disclosure.

FIG. 2 is an example of map information 200 for a section of roadway. The map information 200 includes information identifying the shape, location, and other characteristics of various features including lane lines 210, 212, 214 and fog lines 216, 218 which define lanes 220, 222, 224, 226. Although only a few features are shown and identified, the map information 200 may be highly-detailed and include various additional features such as traffic signal lights, stop signs, rail road crossings, shoulder areas, crosswalks, sidewalks, etc.

Although the map information is depicted herein as an image-based map, the map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location.

Figure 3:
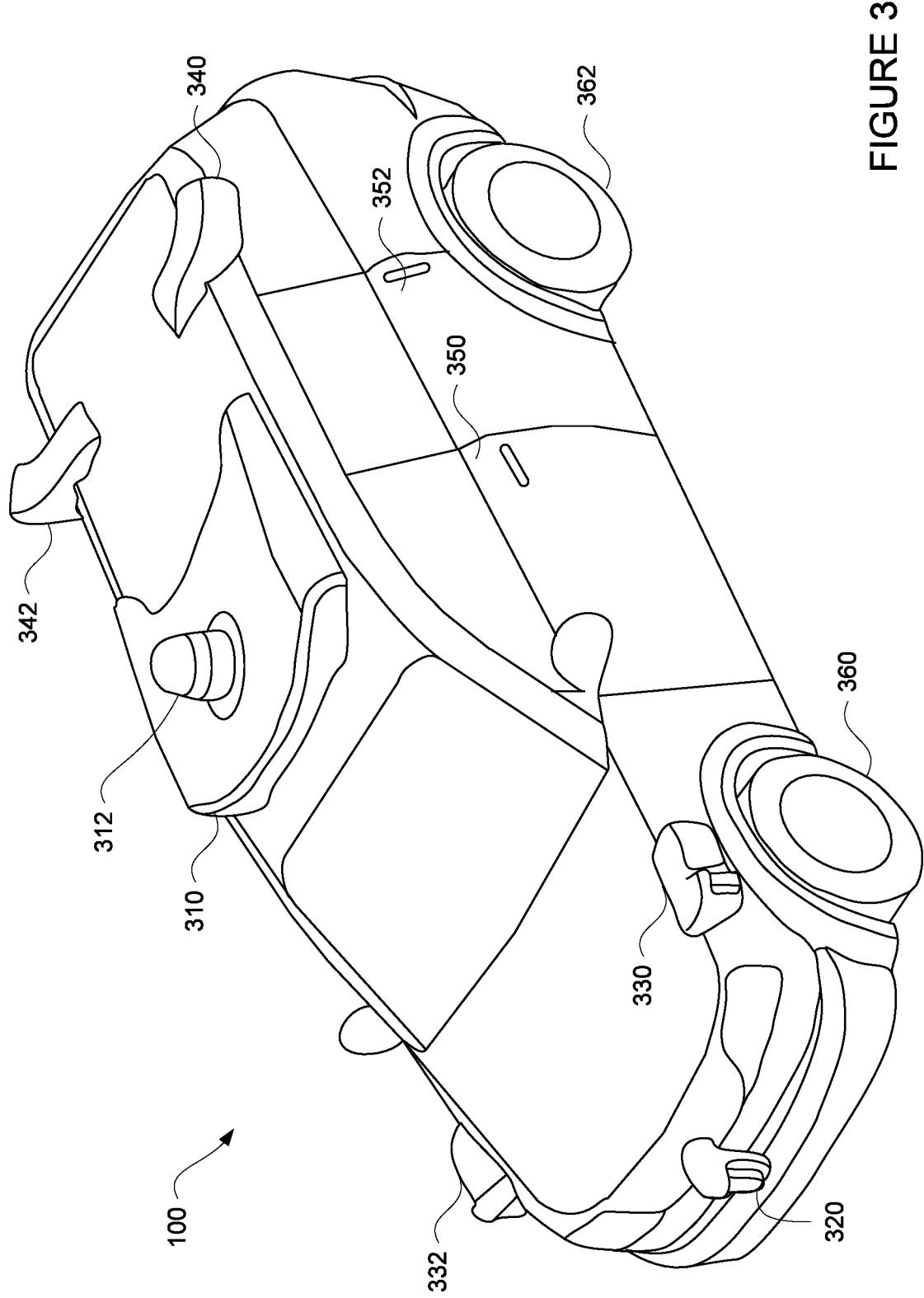
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
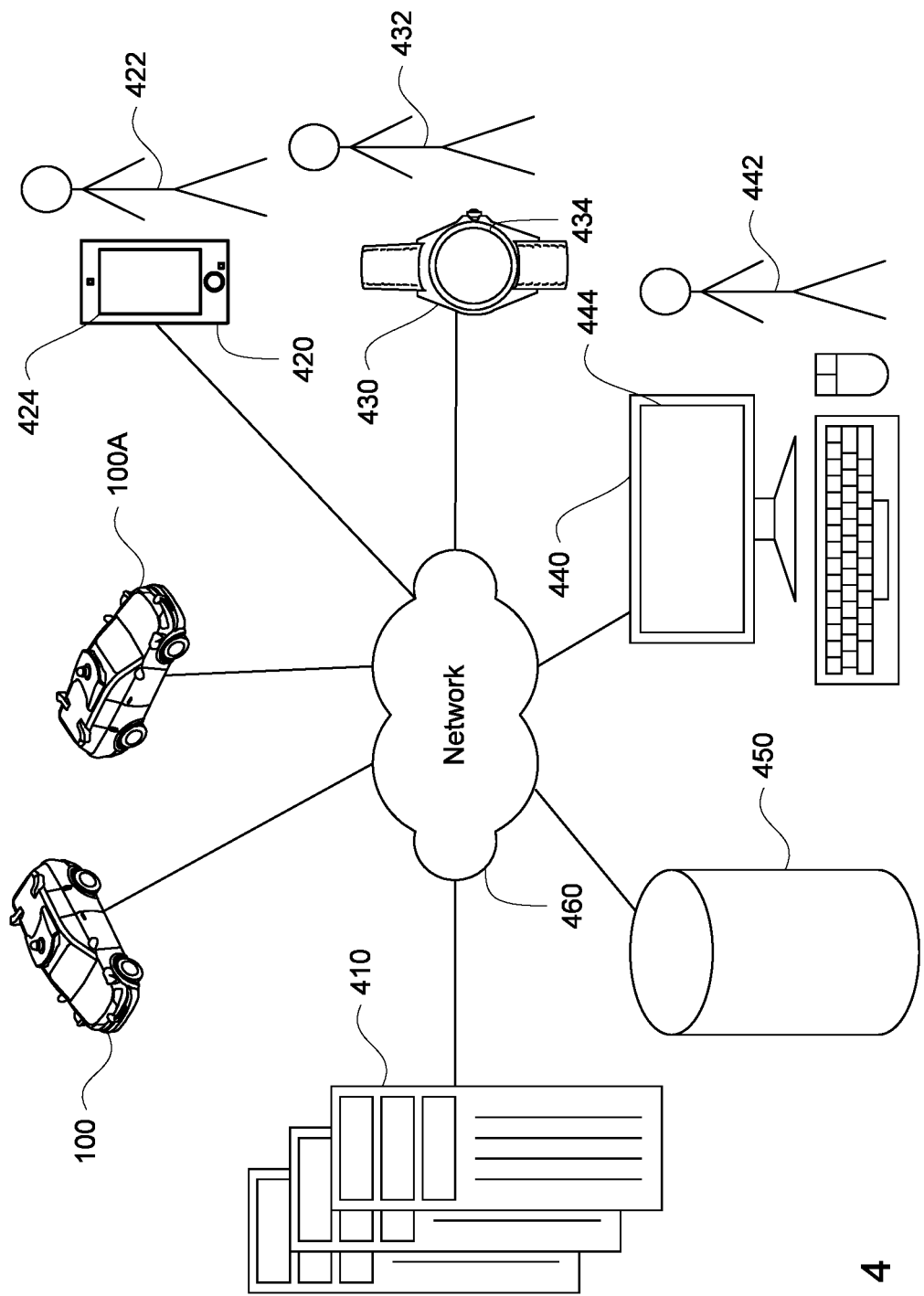
FIG. 4 is a pictorial diagram of an example system in accordance with aspects of the disclosure.
Figure 5:
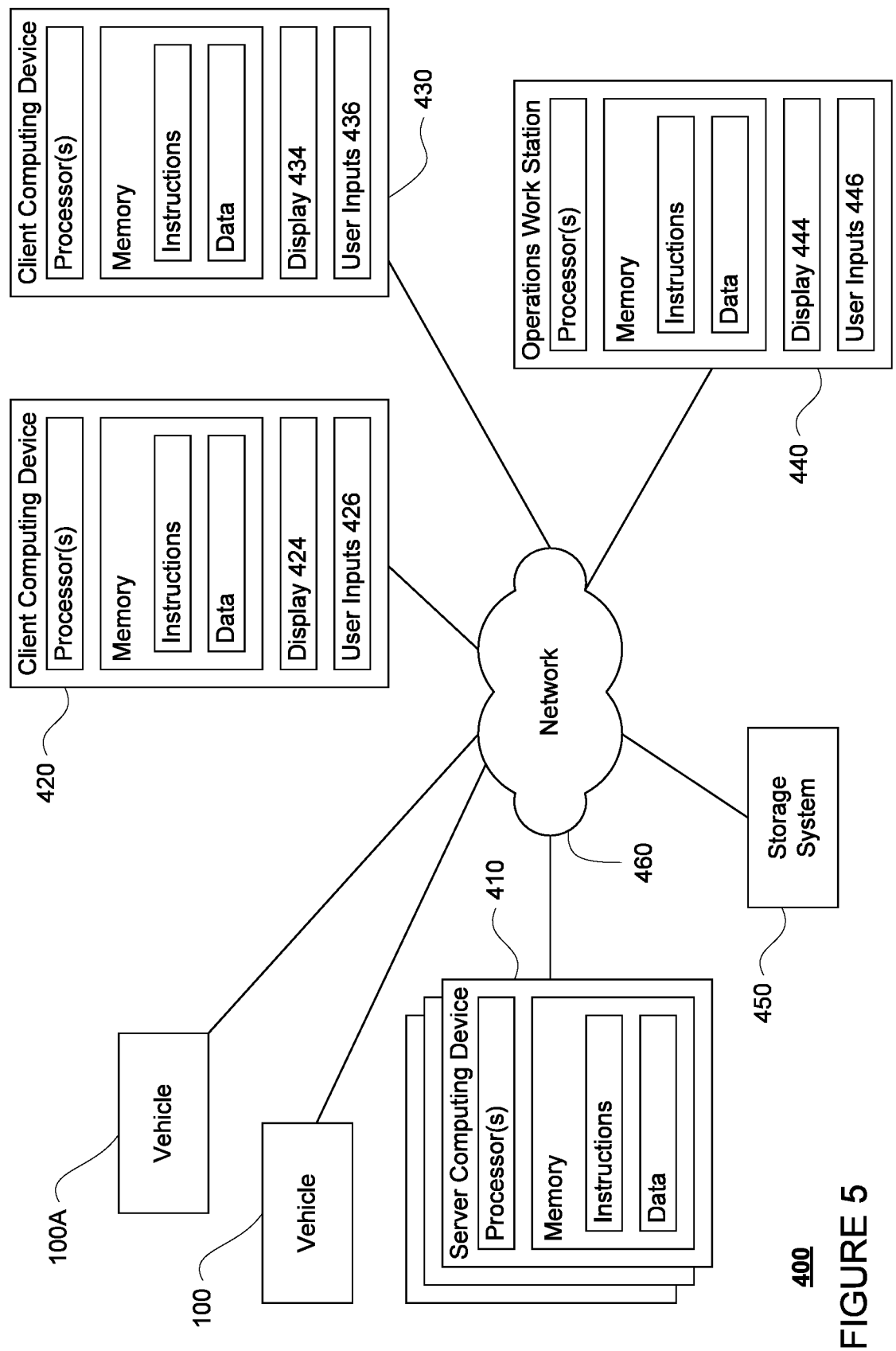
FIG. 5 is a functional diagram of the system of FIG. 4 in accordance with aspects of the disclosure.

Computing device 110 of vehicle 100 may also receive or transfer information to and from other computing devices, such as those computing devices that are a part of the autonomous vehicle service as well as other computing devices. FIGS. 4 and 5 are pictorial and functional diagrams, respectively, of an example system 400 that includes a plurality of computing devices 410, 420, 430, 440 and a storage system 450 connected via a network 460. System 300 also includes vehicle 100 and vehicles 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example, the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. As an example, the storage system may store log data recorded by vehicle 100's (or other vehicle's) various systems. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
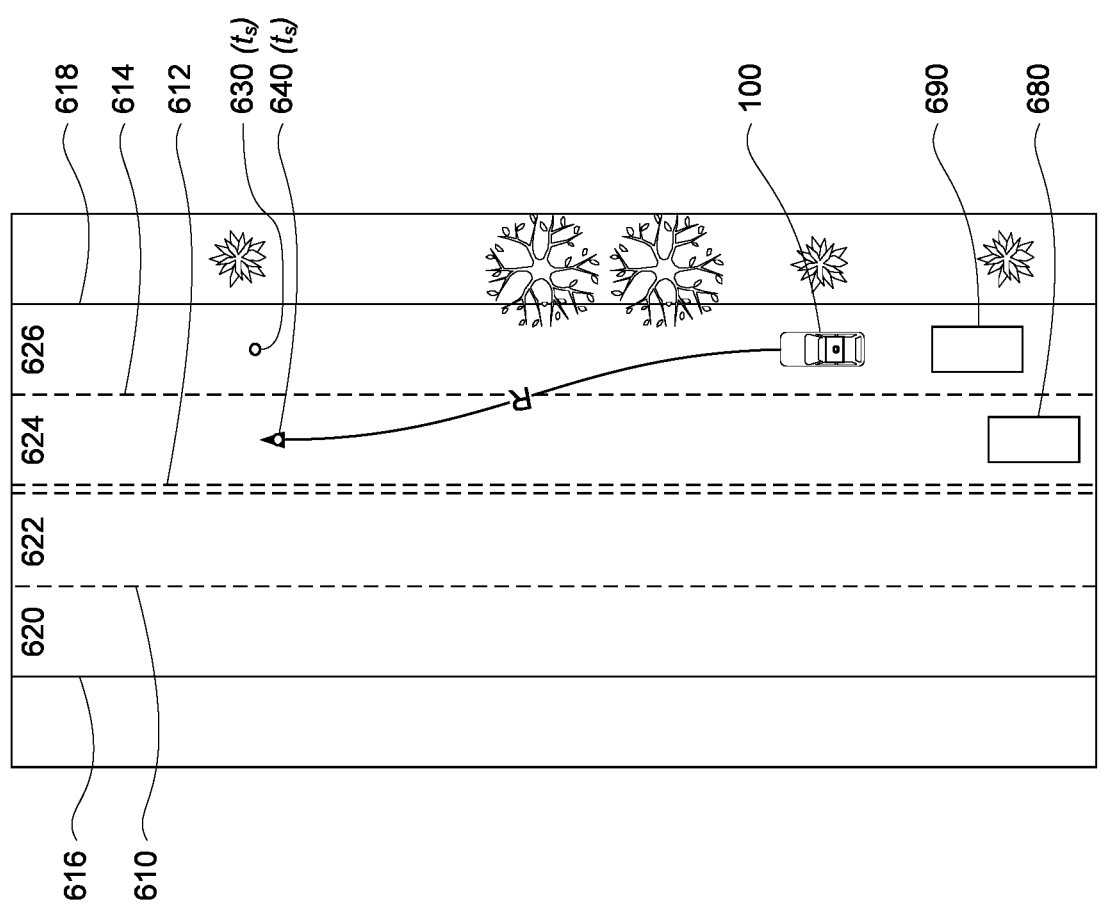
FIG. 6 is an example representation of a roadway corresponding to map information of FIG. 2 in accordance with aspects of the disclosure.

FIG. 6 represents vehicle 100 driving in a section of roadway 600 corresponding to the map information 200. Roadway 600 includes information identifying the shape, location, and other characteristics of various features including lane lines 610, 612, 614 corresponding to lane lines 210, 212, 214, fog lines 616, 618 corresponding to fog lines 216, and lanes 620, 622, 624, 626 corresponding to lanes 220, 222, 224, 226. In this example, vehicle 100 is traveling "North" in lane 626. In addition, vehicle 680 is also traveling "North" in lane 626, and a vehicle 690 is also traveling "North" in lane 624. This example depicts the vehicle 100 at a point in time hereinafter referred to as an initial time $t_o$ and may represent a current, simulated, or prior point in time.

In one instance, assessing counterfactual surprise may include comparing vectors representing different future states of the vehicle 100 for some point in time $t_s$ which may not yet have occurred either in the real world or in a simulation. Referring to FIG. 6, each of vehicles 680 and 690 (or rather, the drivers of such vehicles) may represent observing road users. As noted above, however, road users (and observing road users) may also include bicyclists and pedestrians.

In order to assess surprise of an autonomous vehicle's planned behavior, the computing devices 110 (or other computing devices of the various systems of the vehicle 100 discussed above) may determine an initial state for the vehicle 100 at an initial time $t_o$ which occurs prior to time $t_s$. For instance, the time $t_s$ may represent some point of time in the future relative to the time $t_o$, for instance 0.5 second, 2 seconds, or more or less. If the surprise assessment is occurring using real world data in real time, the time $t_o$ may actually correspond to the current time whereas if the surprise assessment is occurring in a simulation, the time $t_o$ may represent some observation point from which a counterfactual surprise assessment will be made.

As an example, the state may be determined for the initial time $t_o$ represented by the example depicted in FIG. 6. This state may be expressed as a state vector $S_{initial}$, and may include a plurality of values describing the current state or characteristics of the vehicle as determined from the perspective of an observing road use (i.e. any other road user deterred by the perception system 174, including vehicles 680 and 690) as discussed further below. These characteristics may include the vehicle 100's, position, speed, and acceleration (or deceleration) both relative to the road as well as the perspective of the observing road user. These characteristics may be determined from feedback data from the vehicle's various systems, such as the vehicle's positioning system, acceleration system, and/or various sensors of the vehicle.

Figure 7A:
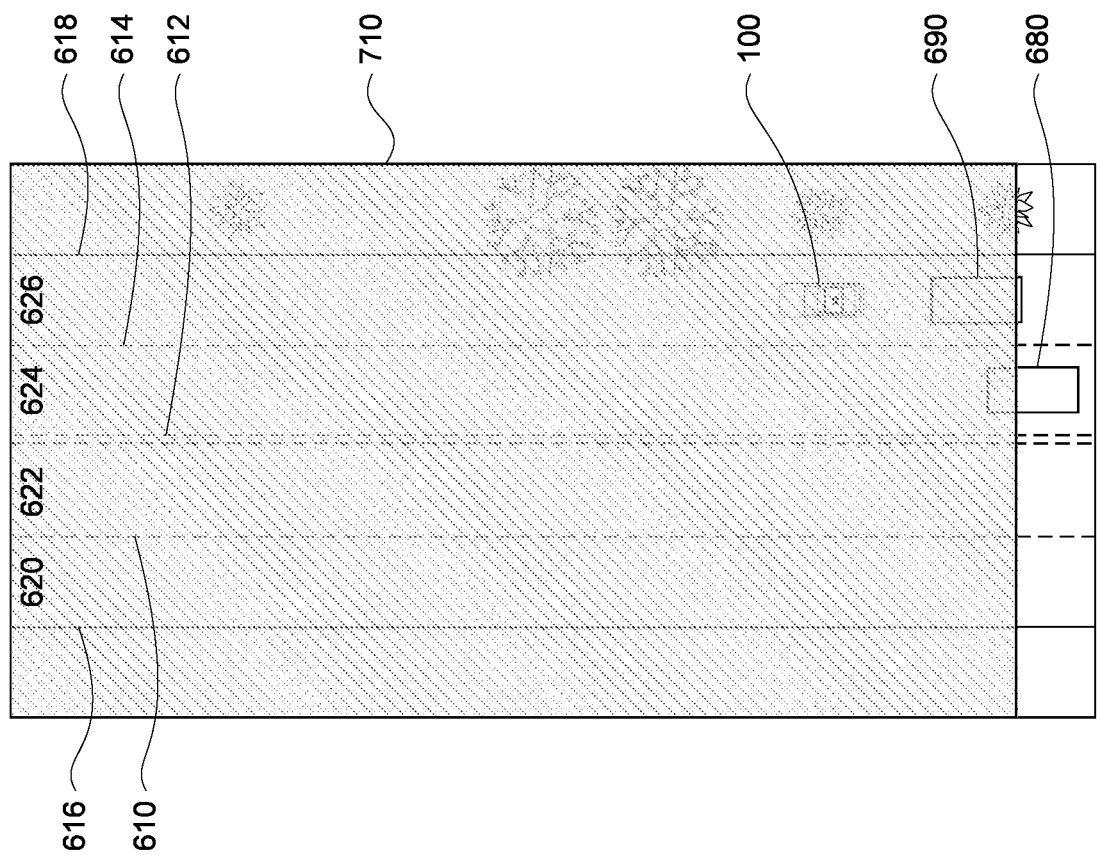
FIGS. 7A and 7B are example representations of the roadway of FIG. 6 and data in accordance with aspects of the disclosure.
Figure 7B:
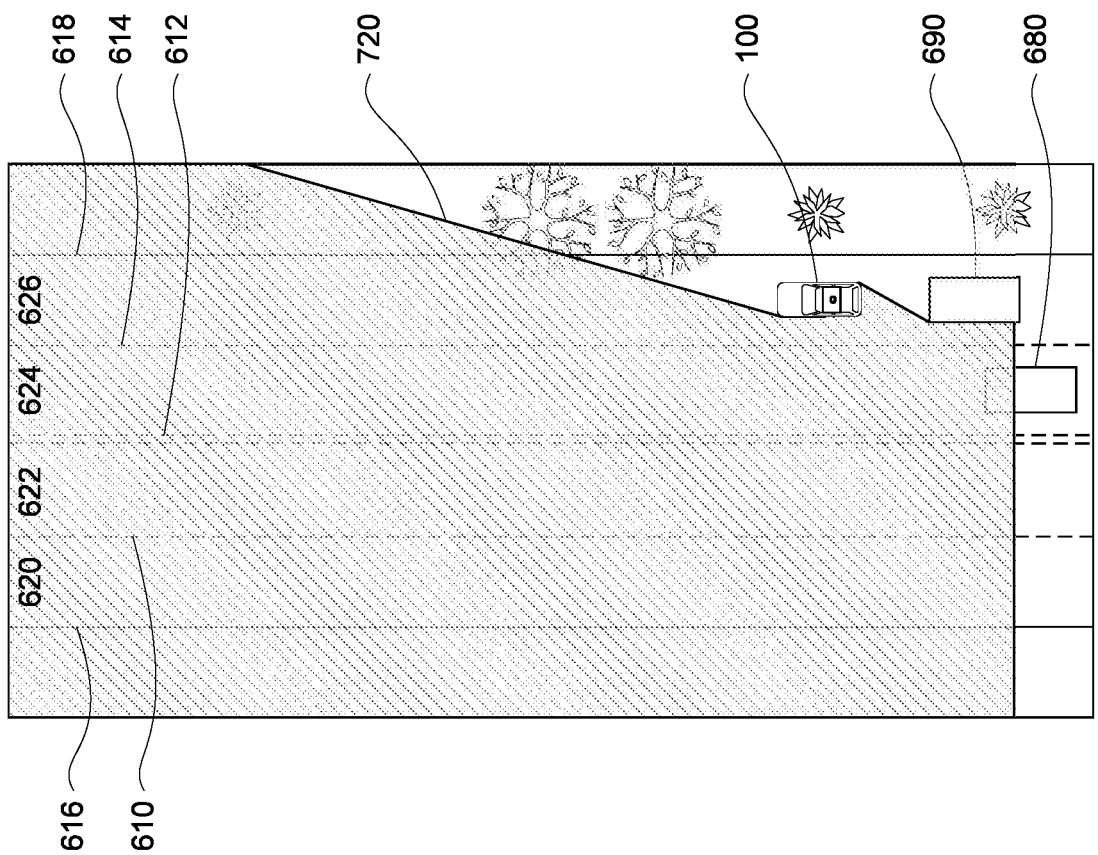

However, in order to determine surprise of the vehicle from the perspective of a specific a road user, only a subset of the characteristics of vehicle 100 from the feedback data may actually be perceived by that road user and used to generate the state vector $S_{initial}$. As such, a model may be used to determine what of the feedback data, including the characteristics of vehicle 100, the observing road user would be able to perceive. For example, the model may be fairly simple and assume that all vehicles are able to perceive an area 180 degrees from a point 1 to 2 meters from the front and/or center of the specific vehicle. Alternatively, the model may be more complex, and may be different for different types of vehicles. As an example, a truck driver may be situated higher up and have a broader field of view than a driver of a small passenger vehicle, while at the same time, the truck driver may have larger blind spots located close to the sides of a truck than the driver of the small passenger vehicle. Turning to the example of FIG. 7A, if the observing road user is vehicle 680, shaded area 710 may represent an area of the roadway that is perceivable by vehicle 680 (or the driver of vehicle 680). In addition, in the example of FIG. 7B, if the observing road user is vehicle 680, shaded area 720 may represent an area of the roadway that is perceivable by vehicle 680 (or the driver of vehicle 680) which takes into account areas of the roadway which are obstructed or otherwise obscured by other objects such as vehicle 690 and vehicle 100. Similar determinations may be made for other road users, such as road user 690.

Similarly, the observing road user may be expected to perceive other road users and vehicle 100's environment differently than the vehicle 100's perception system 174. As such, a similar model or models as those described above may be used to determine what sensor data from the perception system is actually likely be perceived by that road user and used to generate the state vectors (similar to $S_{initial}$) for each one of those other road users. In some instances, the computing devices 110 may also determine a subset of the map information that may be known to and/or perceived by the observing road user.

The computing devices 110 may use a generative model to determine a first state vector for a predicted future state of the vehicle at the time t from the perspective of the observing road user observing the vehicle 100. In other words, the second state may represent a prediction of what the road user observing the vehicle 100 expects the vehicle 100 to do given those observations. The model may take any number of different forms. For instance, the computing devices 110 may use (or simply receive output from) a model of the behavior modeling system 176 to predict the behaviors of other road users. The characteristics of the autonomous vehicle at the current time (for instance in the form of the current state vector $S_{initial}$) from the perspective of the observing road user, characteristics of other road users as determined by the perception system 174 at the current time and from the perspective of the observing road user, and the map information 200 (or in some cases a subset of the map information as noted above) may be input into the generative model.

The output of the generative model may include a prediction of vehicle 100's future behavior from the perspective of the observing road user. This output may include a plurality of possible trajectories for the vehicle through at least the time t, each with an estimation of the probability or precision (1/uncertainty) associated with the prediction. The trajectory with the highest probability or precision (or lowest uncertainty) may be used to generate the first state vector, $S_{to}$, representing the state of the vehicle 100 at time $t_s$ from the perspective of the observing road user. For instance, returning to FIG. 6, in this example, the location 630 represents the expected location of vehicle 100 at time $t_s$. In this regard, an observing road user, such as vehicle 680, may expect the vehicle to remain in lane 626.

The planning system 168 may generate a proposed or future trajectory for a period of time into the future at or beyond some time $t_s$. The trajectory may define the geometry of a future path for the vehicle 100 as well as a speed profile defining the speeds and/or changes in speeds for the vehicle 100 along that future path. A second state vector, $S_{tv}$, may then be determined for the state of the vehicle at the time $t_s$ based on the proposed trajectory as determined by the vehicle's planning system. The proposed trajectory R may cause vehicle 100 to change into lane 624 from lane 626. In this example, the location of 640 represents the point along the proposed trajectory R at which the vehicle 100 will be located at time $t_s$.

The first and second vectors for an observing road user, $S_{to}$ (the state of vehicle 100 expected by the observing road user) and $S_{tv}$ (the state of vehicle 100 given the proposed trajectory R) may then be compared to one another to assess counterfactual surprise for that observing road user. For instance, the absolute values of the differences between the values of the vectors may represent how surprising the vehicle 100's expected behavior at time $t_s$ (when vehicle 100 is following the proposed trajectory) would be to an observing road user. For instance, the Euclidean distance (the distance between the points represented by the vectors) may be used to determine the differences between the vectors and thereby assess counterfactual surprise. In other words, the greater the differences, the greater the amount of counterfactual surprise expected. In some instances, there may be uncertainty information attached to the vectors. In such instances, the Mahalanobis distance between the vectors may be used to determine the differences between the vectors and thereby assess counterfactual surprise. Again, the greater the differences, the greater the amount of counterfactual surprise expected.

In the example of FIG. 6, vehicle 690 and vehicle 680 (or rather, the drivers of these vehicles) may be expected to perceive different information about the vehicle 100. In this regard, the counterfactual surprise which may be by each of these road users may be different. For example, vehicle 690 may expect the vehicle to change into lane 624, while vehicle 680 may expect the vehicle 100 to remain in lane 626. In this regard, the surprise assessments of the proposed trajectory R, when considered from the perspectives of these different vehicles may also be different. In this regard, different surprise assessments may be made for each road user detected by the perception system 166.

Alternatively, rather than assessing counterfactual surprise, a similar approach may be used to assess actual surprise between two points in time, $t_o$ and $t_s$. In this regard, the times $t_o$ and $t_s$ may represent points in time which have already occurred, or for instance, two points in time in recorded log data being used in a simulation as discussed further below. Again, as noted above, time $t_s$ may represent some point in time in the future relative to the time $t_o$, for instance 0.5 second, 2 seconds, or more or less. When assessing actual surprise (as opposed to counterfactual surprise), a state vector $S_{initial}$ may represent the state of the vehicle 100 from the perspective of the observing road user at time $t_o$. This state vector as well as any other vectors for other vehicles expected to be perceived by the observing road users and the map information may be input into the generative model in order to determine a first state vector $S_{ro}$. In addition, a second state vector $S_{rv}$ may be determined for the state of the vehicle at the time t based on the vehicle's actual behavior (i.e. after the vehicle has followed the trajectory). The first and second state vectors may then be compared as described above in order to assess actual surprise. In such examples, the processing may be performed "offline" by the server computing devices 410 or in some instances, in real time and stored for later use by the computing devices 110.

Figure 8:
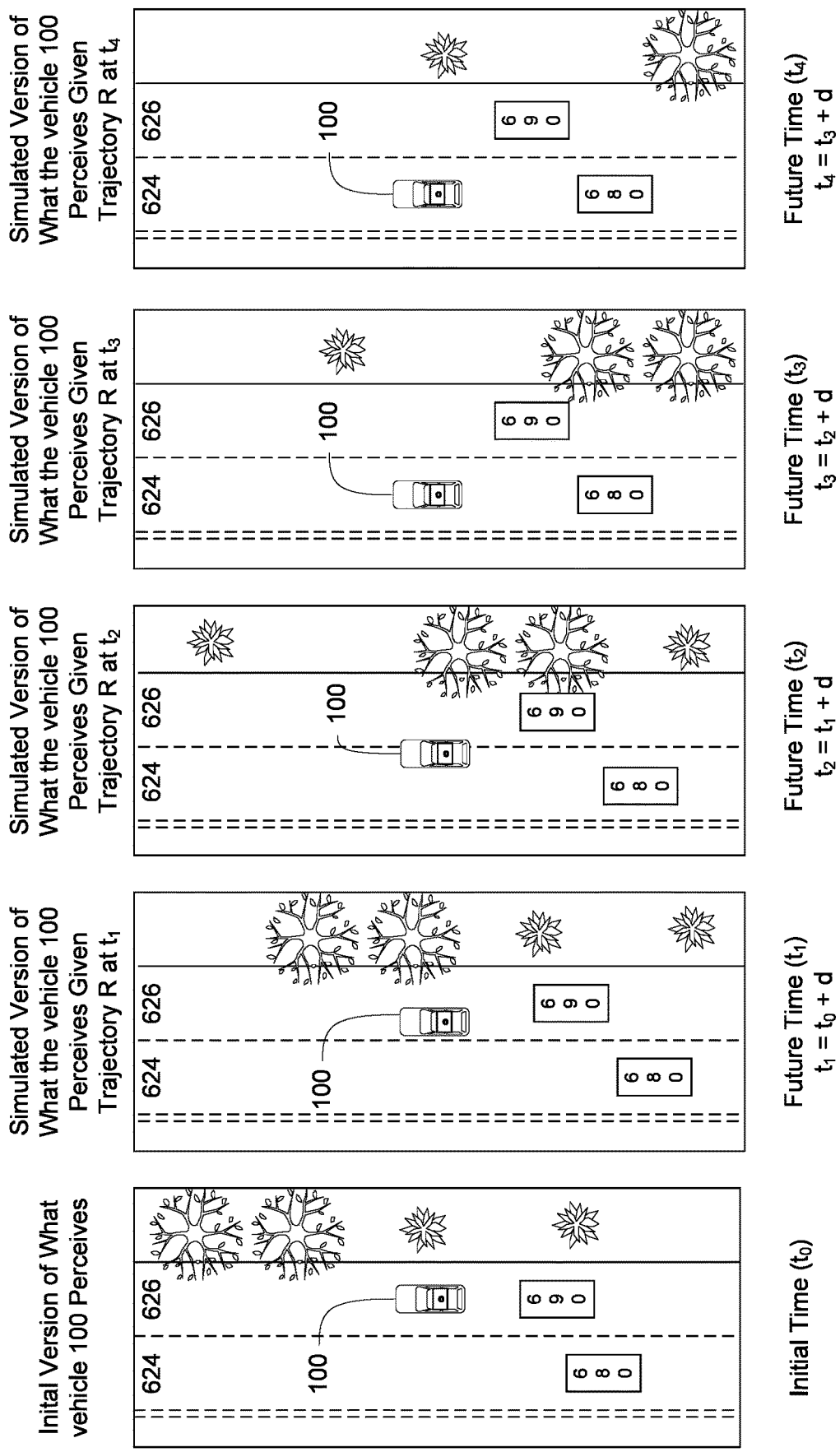
FIG. 8 is example representations of what a vehicle perception system observes at one time as well as these simulated versions of different points in time in accordance with aspects of the disclosure.

Alternatively, rather than comparing vectors, different probability distributions may be compared in order to assess surprise. In order to do so, the computing devices 110 may predict or generate simulated versions of what the vehicle 100 is likely to observe at different points in time. For instance, using the example of FIG. 6, the computing devices 110 may generate simulated versions of what the vehicle 100's perception system is expected to perceive periodically (for instance, every 0.5 seconds) from the initial time to through at least one additional period of time past the time at which the counterfactual surprise is to be assessed. FIG. 8 presents an example of what the vehicle 100's perception system observes at time $t_0$ as well as these simulated versions at times $t_1$, $t_2$, $t_3$, and $t_4$ (used here as a reference only). As can be seen, in this example, between time $t_0$ and time $t_4$, vehicle 100 changes from lane 626 to lane 624. In this example, d may refer to a time step or period for the simulated version (e.g. d=0.5 second or more or less) $t_3$ may correspond to $t_s$, or the point in time for which the counterfactual surprise assessment is to be made.

The simulated versions of what the vehicle's perception system is expected to perceive may be generated using the same or a different generative model and the proposed trajectory (e.g. proposed trajectory R). For instance, the map information 200 as well as the locations and characteristics of other road users (such as vehicles 680 and 690) as perceived by the perception system may be input into the generative model in order to predict where each of these vehicles is likely to be located at the different points in time. As noted above, the output of the generative model may provide a plurality of possible trajectories for each road user from the perspective of the vehicle 100, each with an estimation of the precision (1/uncertainty) associated with the prediction. For each road user, the trajectory with the lowest uncertainty, an average or the trajectories, or some other combination of trajectories may be used to determine the locations of that road user. The simulated locations and other characteristics of vehicle 100 may be determined according to the proposed trajectory R. The result may be a counterfactual simulation of the most likely scenario at each of the different points in time.

Figure 9:
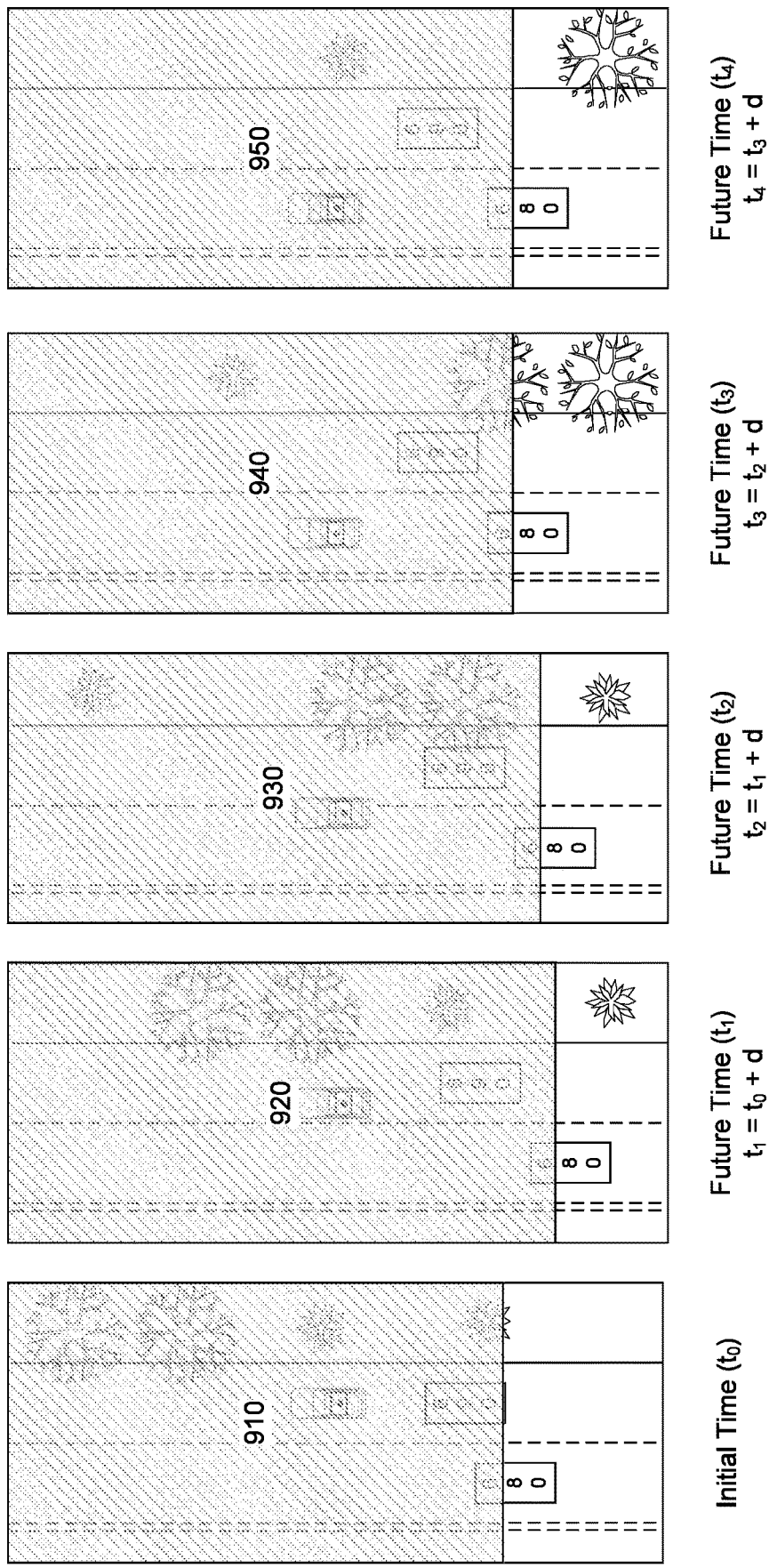
FIG. 9 is example representations of what an observing road user is likely to perceive at different points in time in accordance with aspects of the disclosure.

For each of the different points in time, as with the example above, what each observing road user is able to perceive may be determined. Turning to FIG. 9, each of the shaded areas 910, 920, 930, 940, 950 may represent an area of the roadway that is perceivable by vehicle 680 (or the driver of vehicle 680). As with the example, of FIG. 7B, if the observing road user is vehicle 680, the computing devices 110 may also take into account areas of the roadway which are obstructed or otherwise obscured by other objects such as vehicle 690 and vehicle 100. Similar determinations may be made for other road users, such as vehicle 690.

Figure 10:
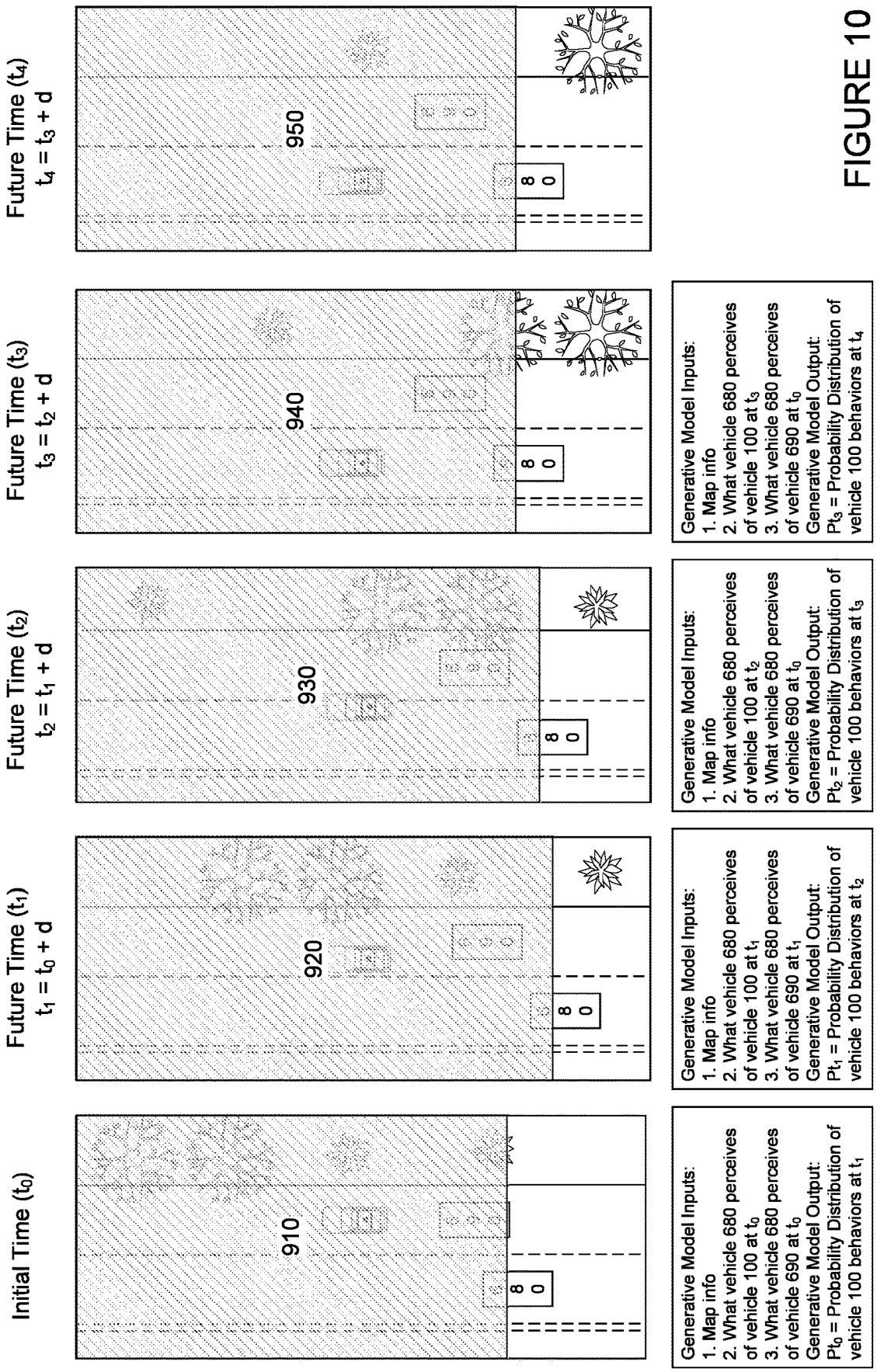
FIG. 10 is an example representation of the determinations of probability distributions at different points in time in accordance with aspects of the disclosure.

The computing devices may then use the same or a different generative model to determine a probability distribution for each of the different points in time. This probability distribution may represent a probability distribution of an observing road user's believe of the vehicle 100's future behaviors or what the vehicle 100 will do next given what the observing road user is expected to have observed about the vehicle 100. For instance, as noted above, the output of the generative model may provide a plurality of possible trajectories for the vehicle through at least the time t, with an estimation of the precision (1/uncertainty) associated with the prediction. The plurality of possible trajectories and the precision values may provide a probability distribution of possible locations and other characteristics (speed, acceleration, heading, orientation, etc.) for the vehicle at each of the different periods of time from the perspective of an observing road user, or $P_{t0}$, $P_{t1}$, $P_{t2}$, $P_{t3}$ as represented in FIG. 10 For instance, FIG. 10 provides a visual representation of the generative model inputs and outputs for each of the different points in time from the perspective of an observing road user corresponding to vehicle 680. For instance, at $t_0$ the generative model inputs include the map information 200 as well as what the vehicle 680 perceives of vehicles 100 and 690 at $t_0$. The output of the generative model is a probability distribution $P_{t0}$ which represents the probability distribution of different behaviors of the vehicle 100 at time $t_1$. At $t_1$ the generative model inputs include the map information 200 as well as what the vehicle 680 is expected to perceive of vehicles 100 and 690 at $t_1$. The output of the generative model is a probability distribution $P_{t1}$ which represents the probability distribution of different behaviors of the vehicle 100 at time $t_2$. At $t_2$ the generative model inputs include the map information 200 as well as what the vehicle 680 is expected to perceive of vehicles 100 and 690 at $t_2$. The output of the generative model is a probability distribution $P_{t2}$ which represents the probability distribution of different behaviors of the vehicle 100 at time $t_3$. At $t_2$ the generative model inputs include the map information 200 as well as what the vehicle 680 is expected to perceive of vehicles 100 and 690 at $t_2$. The output of the generative model is a probability distribution $P_{t3}$ which represents the probability distribution of different behaviors of the vehicle 100 at time $t_4$.

Because different information would be input into the generative model given the different information that observing road users would be likely to perceive, different probability distributions (or values for $P_{t0}$, $P_{t1}$, $P_{t2}$, $P_{t3}$) may be determined for different observing road users (i.e. these values may be different for vehicles 680 and 690).

Figure 11:
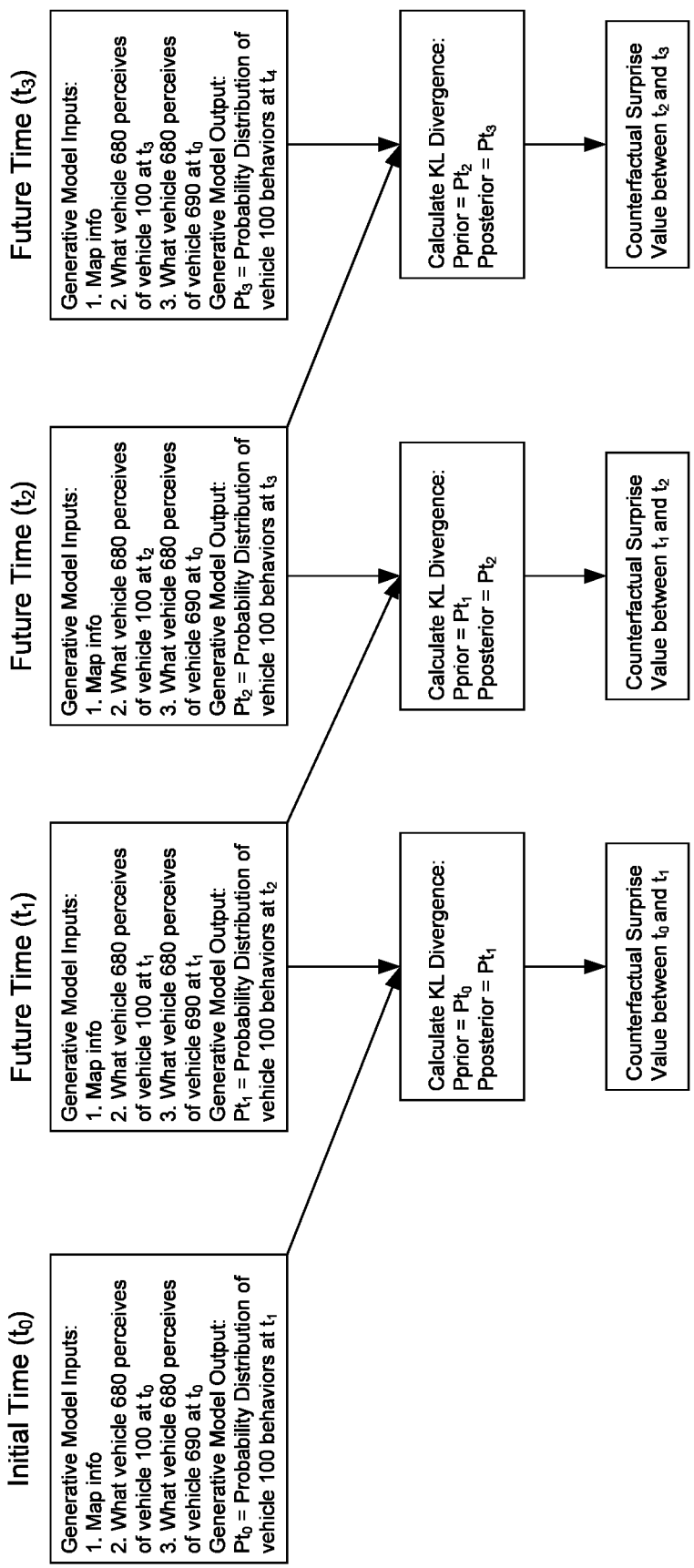
FIG. 11 is an example representation of surprise assessments for different points in time in accordance with aspects of the disclosure.

Counterfactual surprise at time $t_s$ for the observing road user may be assessed by evaluating the difference between probability distributions between adjacent points in time. This may provide an estimate of how surprising the behavior of the vehicle 100 according to the planned trajectory is to an observing road user. For instance, a Kullback-Leibler divergence or KL between a posterior and a prior probability density function may be used to determine a surprise assessment. As an example, a surprise assessment for the trajectory would be $KL(P_{tprior}), P(_{tposterior}))$. The resulting assessment or surprise assessment may represent how surprising or unexpected the planned trajectory would be to other road users as well as passengers of the vehicle. For instance, turning to FIG. 11, the counterfactual surprise or KL divergence for the time $t_1$ may be calculated between the probability distributions $P_{t0}$ and $P_{t1}$, where is $P_{t0}$ is $P_{prior}$ and $P_{t1}$ is $P_{posterior}$. Similarly, the counterfactual surprise or KL divergence for the time $t_2$ may be calculated between the probability distributions $P_{t1}$ and $P_{t2}$, where $P_{t1}$ is $P_{prior}$ and $P_{t2}$ is $P_{posterior}$, and the counterfactual surprise or KL divergence for the time $t_3$ may be calculated between the probability distributions $P_{t2}$ and $P_{t3}$, where $P_{t3}$ is $P_{prior}$ and $P_{t3}$ is $P_{posterior}$. These counterfactual surprise values may then be summed together or otherwise combined in order to determine an overall counterfactual surprise value for $t_s$ (here, $t_3$). The surprise factor could be assessed by taking a weighted summing or otherwise combining the surprise assessments for the trajectory as noted above. Each surprise assessment may be weighted based on how far into the future the surprise assessment was made. For instance, surprise assessments made closer to the present time would have higher weights than surprise assessments made further into the future.

Alternatively, rather than assessing counterfactual surprise, a similar approach may be used to assess actual surprise between two points in time, $t_o$ and $t_s$. In this regard, the times $t_o$ and $t_s$ may represent points in time which have already occurred, or for instance, two points in time in recorded log data being used in a simulation as discussed further below. In this regard, rather than simulating what vehicle 100's perception system is expected to perceive at the different points in time ($t_1$, $t_2$, $t_3$, $t_4$, etc.), what the perception system actually perceived may simply be determined from the log data. The generative model may then be used to estimate the probability distributions $P_{t0}$, $P_{t1}$, $P_{t2}$, $P_{t3}$ as described above, but using the log data (rather than the simulations). These distributions may then be compared as described above in order to assess actual surprise. In such examples, the processing may be performed "offline" by the server computing devices 410 or in some instances, in real time and stored for later use by the computing devices 110.

Surprise assessments can be used in various ways. For instance, a counterfactual surprise assessment can be used by a planning system when generating trajectories to select the trajectory that has the least amount of surprise with respect to other road users. For example, the planning system 168 may select a trajectory with the lowest overall cost. The surprise assessment may be used as a factor to determine the cost of a trajectory such that the higher the surprise assessment, the higher the cost, and the lower the surprise assessment, the lower the cost. In some instances, because surprise may change over time, surprise in the long term may be less of a cost than surprise in the short term. As another instance, the planning system may attempt to solve for a trajectory that has zero surprise associated with that trajectory. If unsuccessful, may increase an acceptable level of surprise (for instance, starting from 0) incrementally until a solution is found.

This may in effect allow the planning system to arbitrate between future actions when there is more than one possible option for the vehicle. As an example, if it is possible for a vehicle to both yield to and not yield to an object, the surprise assessment may be used to determine which behavior with which the vehicle should proceed. As another example, in the event of an imminent collision, the perception system may select the least surprising trajectory in order to try not to make the situation any worse (i.e. the option that results in the least amount of surprise or increase in surprise over time). As another example, if the vehicle 100 is merging into traffic and has to decide whether or not to yield to another object, the planning system may select the least surprising option. As another example, if the vehicle is changing lanes and has to decide when to do so (i.e. whether to allow another road user in the adjacent lane to pass by the vehicle before changing to the adjacent lane), the planning system may select the least surprising option.

In addition, or alternatively, if a selected trajectory is assessed as likely to be surprising to other road users, the vehicle's computing devices may provide a warning message or noise (such as honking a horn) to other nearby road users, thereby reducing the surprise induced by the planned action.

In some instances, an assessment of expected surprise may be used to determine when another road user is likely to respond to the vehicle 100. One way to do this is to input either the surprise values at each of the different points in time, or the probability for a certain trajectory prediction (e.g., the vehicle 100 will change lane), into a an evidence accumulator (or drift diffusion model) of the form: $dA/dt = kx + n$. In this example, A may represent an activation level, x may represent an input signal (here the surprise values at the different points in time), n may represent a random noise, K may represent accumulator gain). The reaction process may then be then modelled as an integration of the input x to a threshold activation level T (where A=T) where the response (braking/steering) is likely to be generated.

Figure 12:
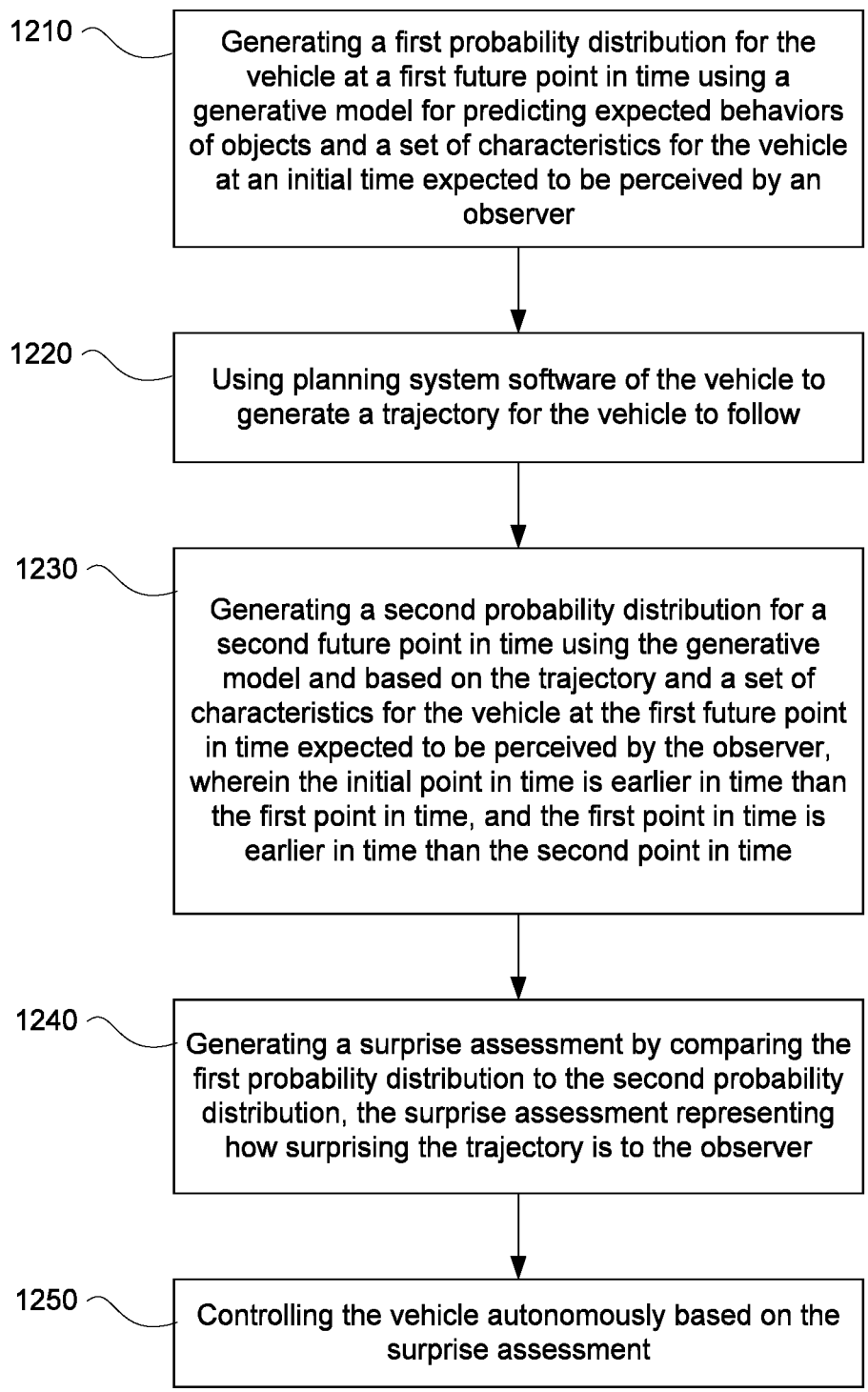
FIG. 12 is an example flow diagram in accordance with aspects of the disclosure.

FIG. 12 is an example flow diagram 1200 of aspects of the technology described herein for controlling an autonomous vehicle, such as vehicle 100, which may be performed by one or more processors of one or more server computing devices of an autonomous vehicle service, such as processors 120 of computing devices 110 or other processors of other computing devices of vehicle 100. At block 1210, a first probability distribution for an autonomous vehicle at a first future point in time is generated using a generative model for predicting expected behaviors of objects and a set of characteristics for the vehicle at an initial point in time expected to be perceived by an observer. This observer may be, for instance, another vehicle (or driver of that vehicle), a pedestrian, a bicyclist, or a passenger of the autonomous vehicle. At block 1220, planning system software of the autonomous vehicle is used to generate a trajectory for the autonomous vehicle to follow. At block 1230, a second probability distribution for a second future point in time is generated using the generative model and based on the trajectory and a set of characteristics for the vehicle at the first future time expected to be perceived by an observer. In this instance, the initial point in time is earlier than the first point in time, and the first future point in time is earlier in time than the second future point in time. At block 1240, a surprise assessment is generated by comparing the first probability distribution to the second probability distribution, the surprise assessment indicating how surprising the trajectory is to an observer. At block 1250, the vehicle is controlled (for instance, autonomously) based on the surprise assessment. Further details of this process are described above.

Surprise assessments can also be used offline to evaluate the vehicle's planning system software or even to compare the surprise assessments of different versions of the software. For instance, processors of server computing devices 410 may run simulations in order to determine how a simulated vehicle would behave according to the planner system software as well as the generative model and/or a different version of the planner system software. At the same time, the behaviors may be assessed as described above in order to assess surprise. This may be used, for instance as a quality metric for evaluating the planner system software, where the less surprising the behaviors are, the better the planner system software may be considered to be. Thus, surprise assessments may be used to compare the performance of different versions of self-driving software, identify and prioritize software bugs etc. For instance, rates of different, or changes in, surprise values on a per mile basis may be tracked across various contexts (e.g. type of road, type of maneuver, types of other vehicles present, etc.), rates of different or changes in surprise values may be tracked on a per software release basis on both driven and simulated miles, surprise values may be used to generate models for human driving (based on miles driven manually by human operators, surprise values observes from other road users, or other third party sources), surprise values may be monitored for regressions or improvements as part of a release management process for releases of new software versions or software updates and as such processes may be established for understanding regressions or improvements before proceeding with a release, etc. In addition, in some instances, surprise values may be assessed on a per-software-change basis so that engineers can assess whether code changes or updates are having the desired effect.

In addition or alternatively, rather than using simulations, log data from miles driven by autonomous vehicles may be used to evaluate the vehicle's planning system software. For instance, processors of server computing devices 410 may use the log data to generate assessments as described above. These assessments can be used to identify situations in which an autonomous vehicle is likely to behave surprisingly and then focus engineering efforts on addressing such situations. For example, the assessments may be used to evaluate how a following vehicle (i.e. the vehicle behind) responded to, or is likely to respond to surprising, behaviors by a lead vehicle (i.e. the vehicle in front). In addition, the assessments may be used to evaluate the planning system software more generally, such as how surprising an autonomous vehicle using the planning system software is on a per mile or other basis and/or using any of the examples above.

Similar assessments may be used to identify surprising behaviors in other road users. For instance, their predicted behaviors (from the generative model) and actual observed behaviors may be determined as described above in order to assess surprise. Such techniques may be useful to avoiding or simply yielding over cautiously to certain road users who are observed to be behaving surprisingly. As another instance, the behaviors of other road users may be tracked over time to try and assess whether they are (more or less) behaving consistently with a nominal model of human driving. This nominal model may also include elements of surprise. As an example, under normal circumstances, nominal human drivers do not do very surprising things very often. In this regard, observing that a given road user is behaving in a way that is likely to be surprising (e.g a surprise assessment that indicates quite a bit of or an increase in surprise with respect to an observing road user or globally) may provide a signal that the given road user may not be a nominal or typical driver. For instance, the driver could be drunk, aggressive, confused (e.g. uncertain about which lane they should be in), lost, etc. This signal can then be used to increase the caution that vehicle 100's computing devices applies to interactions with the given road user, for example, by. keeping a safe distance and considering more uncertainty in the behavior predictions made for such road users.

Although the examples described herein relate to determining counterfactual or actual surprise from the perspective of an observing road user, alternatively, the surprise assessment may be a global determination. For instance, rather than limiting the input into the generative model to that which is likely to be perceived by the observer, all of the data available to the autonomous vehicle may be input into the generative model. In other words, the input to the generative model may be from the perspective of the vehicle 100 rather than some other vehicle. This may provide a less computationally expensive assessment of surprise, but at the same time, may miss some of the nuances which may arise from different vehicles having different perspectives and expectations of what the vehicle 100 is likely to do.

Although the examples described herein relate to counterfactual or actual surprise of other road users, a similar approach may be used to assess counterfactual or actual surprise of a passenger of the vehicle 100. In this case, the sensor data used to generate the state vectors would be different as a passenger has a different vantage point (i.e., access to different information than a person outside the vehicle) than an observer person outside of the vehicle 100 a road user. In addition, since the passenger would have a different vantage point, a generative model that attempts to predict what a vehicle would do using the perspective of a passenger would be used.

The features described herein may thus allow for the assessment of how surprising behavior of an autonomous vehicle is to any observing road users and/or passengers of the vehicle. This surprise assessment can then be used to make various driving decisions for the autonomous vehicle. This, in turn, may reduce the likelihood of uncomfortable or possibly dangerous situations for other road users and/or passengers of the vehicle. In addition, surprise assessments may also be used offline to assess driving quality as perceived by passengers of the autonomous vehicles and/or other road users.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling an autonomous vehicle, the method comprising:
   generating, for an initial time using a generative model that predicts vehicle states from the perspective of an observer of the vehicle, a first plurality of predicted vehicle states of the vehicle at a future point in time;
   obtaining, from a vehicle planning system of the vehicle, a first candidate trajectory for the vehicle to follow, the first candidate trajectory being one of a plurality of candidate trajectories to be evaluated;
   generating, by the generative model, a second plurality of predicted vehicle states based on the first candidate trajectory, the second plurality of predicted vehicle states representing predicted vehicle states at the future point in time assuming that the vehicle has initiated the first candidate trajectory generated by the vehicle planning subsystem, wherein the second plurality of predicted vehicle states are based on a set of characteristics for the vehicle after initiating the first candidate trajectory;
   generating a measure of observer surprise for the observer of the vehicle including comparing the first plurality of predicted vehicle states to the second plurality of predicted vehicle states based on the first candidate trajectory, the measure of observer surprise representing how surprising the vehicle following the first candidate trajectory would be to the observer; and
   based on the measure of observer surprise, causing the vehicle to select and follow a different candidate trajectory from the plurality of candidate trajectories.

2. The method of claim 1, wherein the generative model is trained to generate predicted vehicle states from the perspective of a passenger of the vehicle.

3. The method of claim 1, wherein the generative model is trained to generate predicted vehicle states from the perspective of another vehicle.

4. The method of claim 1, wherein the generative model is trained to generate predicted vehicle states from the perspective of a pedestrian.

5. The method of claim 1, wherein the generative model is trained to generate predicted vehicle states from the perspective of a bicyclist.

6. The method of claim 1, wherein comparing the first plurality of predicted vehicle states to the second plurality of predicted vehicle states comprises determining a Kullback-Leibler divergence between a first probability distribution representing the first plurality of predicted vehicle states and a second probability distribution representing the second plurality of predicted vehicle states.

7. The method of claim 1, wherein the first candidate trajectory includes a geometry component and a speed profile that define a future behavior of the vehicle, and wherein the measure of observer surprise corresponds to how surprising the future behavior is to the observer.

8. The method of claim 1, wherein the observer is a road user, and the method further comprises:
   receiving sensor data identifying characteristics of the observer; and
   using the generative model to predict a future behavior of the road user, and wherein generating the second plurality of predicted vehicle states is further based on the predicted future behavior of the road user.

9. The method of claim 1, further comprising:
   using the vehicle planning system to generate the different candidate trajectory for the vehicle; and
   determining a second measure of observer surprise for the different candidate trajectory, and wherein causing the vehicle to select the different candidate trajectory comprises selecting a candidate trajectory having a lower measure of observer surprise.

10. The method of claim 1, wherein the vehicle planning system is configured to continually generate candidate trajectories until generating a candidate trajectory that does not exceed a threshold measure of observer surprise.

11. A system comprising:
    one or more computers and one or more storage devices storing instructions that are operable, when executed by the one or more computers, to cause the one or more computers to perform operations comprising:
    generating, for an initial time using a generative model that predicts vehicle states from the perspective of an observer of the vehicle, a first plurality of predicted vehicle states of the vehicle at a future point in time;
    obtaining, from a vehicle planning system of the vehicle, a first candidate trajectory for the vehicle to follow, the first candidate trajectory being one of a plurality of candidate trajectories to be evaluated;
    generating, by the generative model, a second plurality of predicted vehicle states based on the first candidate trajectory, the second plurality of predicted vehicle states representing predicted vehicle states at the future point in time assuming that the vehicle has initiated the first candidate trajectory generated by the vehicle planning subsystem, wherein the second plurality of predicted vehicle states are based on a set of characteristics for the vehicle after initiating the first candidate trajectory;
    generating a measure of observer surprise for the observer of the vehicle including comparing the first plurality of predicted vehicle states to the second plurality of predicted vehicle states based on the first candidate trajectory, the measure of observer surprise representing how surprising the vehicle following the first candidate trajectory would be to the observer; and
    based on the measure of observer surprise, causing the vehicle to select and follow a different candidate trajectory from the plurality of candidate trajectories.

12. The system of claim 11, wherein the generative model is trained to generate predicted vehicle states from the perspective of a passenger of the vehicle.

13. The system of claim 11, wherein the generative model is trained to generate predicted vehicle states from the perspective of another vehicle.

14. The system of claim 11, wherein the generative model is trained to generate predicted vehicle states from the perspective of a pedestrian.

15. The system of claim 11, wherein the generative model is trained to generate predicted vehicle states from the perspective of a bicyclist.

16. The system of claim 11, wherein comparing the first plurality of predicted vehicle states to the second plurality of predicted vehicle states comprises determining a Kullback-Leibler divergence between a first probability distribution representing the first plurality of predicted vehicle states and a second probability distribution representing the second plurality of predicted vehicle states.

17. The system of claim 11, wherein the first candidate trajectory includes a geometry component and a speed profile that define a future behavior of the vehicle, and wherein the measure of observer surprise corresponds to how surprising the future behavior is to the observer.

18. The system of claim 11, wherein the observer is a road user, and the method further comprises:
receiving sensor data identifying characteristics of the observer; and
using the generative model to predict a future behavior of the road user, and wherein generating the second plurality of predicted vehicle states is further based on the predicted future behavior of the road user.

19. The system of claim 11, wherein the operations further comprise:
using the vehicle planning system to generate the different candidate trajectory for the vehicle; and
determining a second measure of observer surprise for the different candidate trajectory, and wherein causing the vehicle to select the different candidate trajectory comprises selecting a candidate trajectory having a lower measure of observer surprise.

20. The system of claim 11, wherein the vehicle planning system is configured to continually generate candidate trajectories until generating a candidate trajectory that does not exceed a threshold measure of observer surprise.

21. One or more non-transitory computer storage media encoded with computer program instructions that when executed by one or more computers cause the one or more computers to perform operations comprising:
generating, for an initial time using a generative model that predicts vehicle states from the perspective of an observer of the vehicle, a first plurality of predicted vehicle states of the vehicle at a future point in time;
obtaining, from a vehicle planning system of the vehicle, a first candidate trajectory for the vehicle to follow, the first candidate trajectory being one of a plurality of candidate trajectories to be evaluated;
generating, by the generative model, a second plurality of predicted vehicle states based on the first candidate trajectory, the second plurality of predicted vehicle states representing predicted vehicle states at the future point in time assuming that the vehicle has initiated the first candidate trajectory generated by the vehicle planning subsystem, wherein the second plurality of predicted vehicle states are based on a set of characteristics for the vehicle after initiating the first candidate trajectory;
generating a measure of observer surprise for the observer of the vehicle including comparing the first plurality of predicted vehicle states to the second plurality of predicted vehicle states based on the first candidate trajectory, the measure of observer surprise representing how surprising the vehicle following the first candidate trajectory would be to the observer; and
based on the measure of observer surprise, causing the vehicle to select and follow a different candidate trajectory from the plurality of candidate trajectories.

22. The one or more computer storage media of claim 21, wherein the generative model is trained to generate predicted vehicle states from the perspective of a passenger of the vehicle.

23. The one or more computer storage media of claim 21, wherein the generative model is trained to generate predicted vehicle states from the perspective of another vehicle.

24. The one or more computer storage media of claim 21, wherein the generative model is trained to generate predicted vehicle states from the perspective of a pedestrian.

25. The one or more computer storage media of claim 21, wherein the generative model is trained to generate predicted vehicle states from the perspective of a bicyclist.

26. The one or more computer storage media of claim 21, wherein comparing the first plurality of predicted vehicle states to the second plurality of predicted vehicle states comprises determining a Kullback-Leibler divergence between a first probability distribution representing the first plurality of predicted vehicle states and a second probability distribution representing the second plurality of predicted vehicle states.

27. The one or more computer storage media of claim 21, wherein the first candidate trajectory includes a geometry component and a speed profile that define a future behavior of the vehicle, and wherein the measure of observer surprise corresponds to how surprising the future behavior is to the observer.

28. The one or more computer storage media of claim 21, wherein the observer is a road user, and the method further comprises:
receiving sensor data identifying characteristics of the observer; and
using the generative model to predict a future behavior of the road user, and wherein generating the second plurality of predicted vehicle states is further based on the predicted future behavior of the road user.

29. The one or more computer storage media of claim 21, wherein the operations further comprise:
using the vehicle planning system to generate the different candidate trajectory for the vehicle; and
determining a second measure of observer surprise for the different candidate trajectory, and wherein causing the vehicle to select the different candidate trajectory comprises selecting a candidate trajectory having a lower measure of observer surprise.

30. The one or more computer storage media of claim 21, wherein the vehicle planning system is configured to continually generate candidate trajectories until generating a candidate trajectory that does not exceed a threshold measure of observer surprise.

* * * * *